(12) United States Patent
Li et al.

(10) Patent No.: US 10,628,649 B2
(45) Date of Patent: Apr. 21, 2020

(54) FINGERPRINT RECOGNITION PROCCESS

(71) Applicant: BEIJING XIAOMI MOBILE SOFTWARE CO., LTD., Beijing (CN)

(72) Inventors: Guosheng Li, Beijing (CN); Yinghong Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 40 days.

(21) Appl. No.: 16/100,398

(22) Filed: Aug. 10, 2018

(65) Prior Publication Data
US 2019/0057240 A1   Feb. 21, 2019

(30) Foreign Application Priority Data

Aug. 15, 2017   (CN) .......................... 2017 1 0698273

(51) Int. Cl.
```
G06K 9/20      (2006.01)
G06K 9/00      (2006.01)
G06F 1/3231    (2019.01)
G06F 1/3234    (2019.01)
G06F 1/3287    (2019.01)
G06K 9/03      (2006.01)
```
(52) U.S. Cl.
CPC ....... *G06K 9/00006* (2013.01); *G06F 1/3231* (2013.01); *G06F 1/3262* (2013.01); *G06F 1/3287* (2013.01); *G06K 9/0002* (2013.01); *G06K 9/03* (2013.01)

(58) Field of Classification Search
CPC ........ G06K 9/00006–0012; G06K 9/03; G06F 1/3287; G06F 1/3262; G06F 1/3231
See application file for complete search history.

(56) References Cited

U.S. PATENT DOCUMENTS

| | | | |
|---|---|---|---|
| 2012/0009896 A1 | 1/2012 | Bandyopadhyay et al. | |
| 2012/0071149 A1* | 3/2012 | Bandyopadhyay | G06F 1/1643 |
| | | | 455/418 |

(Continued)

FOREIGN PATENT DOCUMENTS

| | | |
|---|---|---|
| CN | 106020418 A | 10/2016 |
| CN | 106022072 A | 10/2016 |

(Continued)

OTHER PUBLICATIONS

Machine translation of CN107016271A, Haitao et al., "A kind of data processing method and relevant device", published on Aug. 4, 2017, pp. 1-9. (Year: 2017).*

(Continued)

*Primary Examiner* — Brian Werner
(74) *Attorney, Agent, or Firm* — Arch & Lake LLP (57) ABSTRACT

A method of recognizing a fingerprint, an electronic device and a non-transitory machine-readable storage medium are provided in the present disclosure. The method includes: touch information on a designated area within a touch screen of an electronic device is obtained when a fingerprint recognition fails, where a distance between the designated area and a fingerprint collection area of the fingerprint recognition is within a designated range; and a fingerprint recognition failure operation is prohibited from being executed when the touch information indicates that the designated area satisfies a preset touch condition.

20 Claims, 8 Drawing Sheets

(56) References Cited

U.S. PATENT DOCUMENTS

| | | | | |
|---|---|---|---|---|
| 2015/0086090 | A1* | 3/2015 | Jung | G06K 9/00013 |
| | | | | 382/124 |
| 2016/0063230 | A1 | 3/2016 | Alten | |
| 2016/0307020 | A1* | 10/2016 | Zhang | G06K 9/0002 |
| 2016/0379039 | A1 | 12/2016 | Dagan et al. | |
| 2017/0300736 | A1* | 10/2017 | Song | G06K 9/00033 |
| 2018/0300529 | A1* | 10/2018 | Zuo | G06F 1/3293 |
| 2019/0034696 | A1* | 1/2019 | Zhang | G06K 9/0002 |

FOREIGN PATENT DOCUMENTS

| | | |
|---|---|---|
| CN | 106155504 A | 11/2016 |
| CN | 106203048 A | 12/2016 |
| CN | 106462687 A | 2/2017 |
| CN | 106599641 A | 4/2017 |
| CN | 106774803 A | 5/2017 |
| CN | 106775150 A | 5/2017 |
| CN | 106778169 A | 5/2017 |
| CN | 107016271 A | 8/2017 |
| CN | 107016337 A | 8/2017 |
| WO | 2013079267 A1 | 6/2013 |

OTHER PUBLICATIONS

Extended European search report issued in corresponding European Application No. 18189076.5, dated Feb. 19, 2019, 9 pages.

Tao Feng et al, "Touch Panel with Integrated Fingerprint Sensors Based User Identity Management" 2013 IEEE International Conference on Technologies for Homeland Security (HST), IEEE, Nov. 12, 2013. 4 pages, XP032550157. DOI: 10.1109/THS.2013.6698992.

State Intellectual Property Office of the People's Republic of China, First Office Action and Search Report Issued in Chinese Application No. 201710698273.1, dated Nov. 7, 2019, (Submitted with Machine Translation), (15p).

* cited by examiner

FINGERPRINT RECOGNITION PROCCESS

CROSS REFERENCE TO RELATED APPLICATIONS

This application is based upon and claims priority to Chinese Patent Application No. 201710698273.1, filed on Aug. 15, 2017, the entire content of which is incorporated herein by reference for all purposes.

TECHNICAL FIELD

The present disclosure relates data processing technology and particularly relates to a fingerprint recognition process.

BACKGROUND

Electronic devices are increasingly used and have become important tools in people's daily work and lives. To secure user information on the electronic device, a fingerprint recognition function may be provided in the electronic device when the electronic device is in use. An identity of the user may be authenticated when operations with high security requirements such as unlocking the device or electronic payment operations are performed on the electronic device.

SUMMARY

The present disclosure provides a method of recognizing a fingerprint, an electronic device, and a non-transitory machine-readable storage medium.

According to a first aspect of the present disclosure, a method of processing fingerprint recognition is provided. The method includes: obtaining touch information on a designated area within a touch screen of an electronic device when a fingerprint recognition fails, where a distance between the designated area and a fingerprint collection area for recognizing the fingerprint is within a designated range; and prohibiting a fingerprint recognition failure operation from being executed when the touch information indicates that the designated area satisfies a preset touch condition.

According to a second aspect of the present disclosure, an electronic device is provided, which includes: a processor and a non-transitory machine-readable storage medium to store instructions that are executable by the processor. The processor is configured to: obtain touch information on a designated area within a touch screen of a device when a fingerprint recognition fails, where a distance between the designated area and a fingerprint collection area for recognizing a fingerprint is within a designated range; and prohibit a fingerprint recognition failure operation from being executed when the touch information indicates that the designated area satisfies a preset touch condition.

According to a third aspect of the present disclosure, a non-transitory machine-readable storage medium is provided. Machine executable instructions are stored on the non-transitory machine-readable storage medium. The machine executable instructions cause a processor to perform: obtaining touch information on a designated area within a touch screen of an electronic device when a fingerprint recognition fails, where a distance between the designated area and a fingerprint collection area for recognizing a fingerprint is within a designated range; and prohibiting a fingerprint recognition failure operation from being executed when the touch information indicates that the designated area satisfies a preset touch condition.

It shall be appreciated that the above general descriptions and the following detailed descriptions are merely illustrative and explanatory and cannot limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Illustrative examples will be described in detail here with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present.

The terms used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, and the like in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "in response to determining".

While the fingerprint recognition function brings convenience, mis-touching brings relatively great trouble to people. When the user or other object mis-touches a fingerprint collection area on the electronic device, it may cause that capacitance of the electronic device is changed and a fingerprint recognition operation is performed. For example, when a smart phone is placed in a pocket of clothes, since the clothes are thin, it may cause that a fingerprint circuit contacts with the human skin and then capacitance of the smart phone is changed. The fingerprint circuit performs a fingerprint recognition operation and corresponding processing. For another example, in a case that the user accidentally touches the fingerprint circuit while holding the smart phone, it may cause that capacitance of the smart phone is changed and the fingerprint circuit performs a fingerprint recognition operation and corresponding processing.

Mis-touching the fingerprint collection area may cause the electronic device to vibrate. If the number of incorrect recognition times exceeds a preset threshold, it may occur that fingerprint unlocking cannot be performed on the device when the correct finger touches the fingerprint collection area. In addition, the touch screen of the electronic device may be lighted up during the fingerprint recognition operation and mis-touching the fingerprint collection area may cause the touch screen to light up, thereby wasting power.

Based on this, examples of the present disclosure provide a method of processing fingerprint recognition. In the method, a fingerprint recognition operation may be performed when fingerprint information is collected; if a fingerprint recognition fails, touch information on a designated area within a touch screen may be obtained; it is determined whether the designated area satisfies a preset touch condition based on the touch information, so as to determine whether the current touch operation is a mis-touching operation; and when it is determined that the current touch operation is the mis-touching operation, a fingerprint recognition failure operation is prohibited from being executed, thereby avoiding some problems caused by executing the fingerprint recognition failure operation due to mis-touching. These problems may include power waste, vibrating prompt and the accumulated number of incorrect recognition times reaching the preset threshold. When the accumulated number of incorrect recognition times reaches the preset threshold, unlocking the device by using the fingerprint may not be performed normally.

The method of processing fingerprint recognition provided by examples of the present disclosure will be described in detail.

Figure 1A:
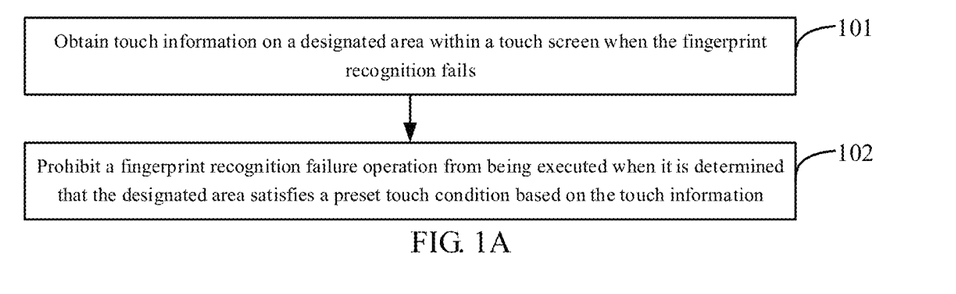
FIG. 1A is a flowchart of a method of processing fingerprint recognition according to an example of the present disclosure.

FIG. 1A is a flowchart of a method of processing fingerprint recognition according to an example of the present disclosure. The method may be applied in an electronic device and includes the following steps:

At step 101, touch information on a designated area within a touch screen is obtained when the fingerprint recognition fails. The designated area includes a touch area, and a distance between the touch area and a fingerprint collection area is within a designated range.

At step 102, a fingerprint recognition failure operation is prohibited from being executed when it is determined that the designated area satisfies a preset touch condition based on the touch information. When the touch information indicates that the designated area satisfies a preset touch condition, the fingerprint recognition failure operation is prohibited from being executed.

In examples of the present disclosure, the electronic device may be a smart phone, a tablet computer, a PDA (Personal Digital Assistant), an e-book reader, a multimedia player, a portable device, etc., having a touch function and a fingerprint recognition function.

In some examples, a touch display screen (e.g., a touch screen and a display screen are overlapped to form an overlapping area having a touch function and a display function) and a fingerprint circuit in the fingerprint collection area may be separated in an electronic device.

Figure 1B:
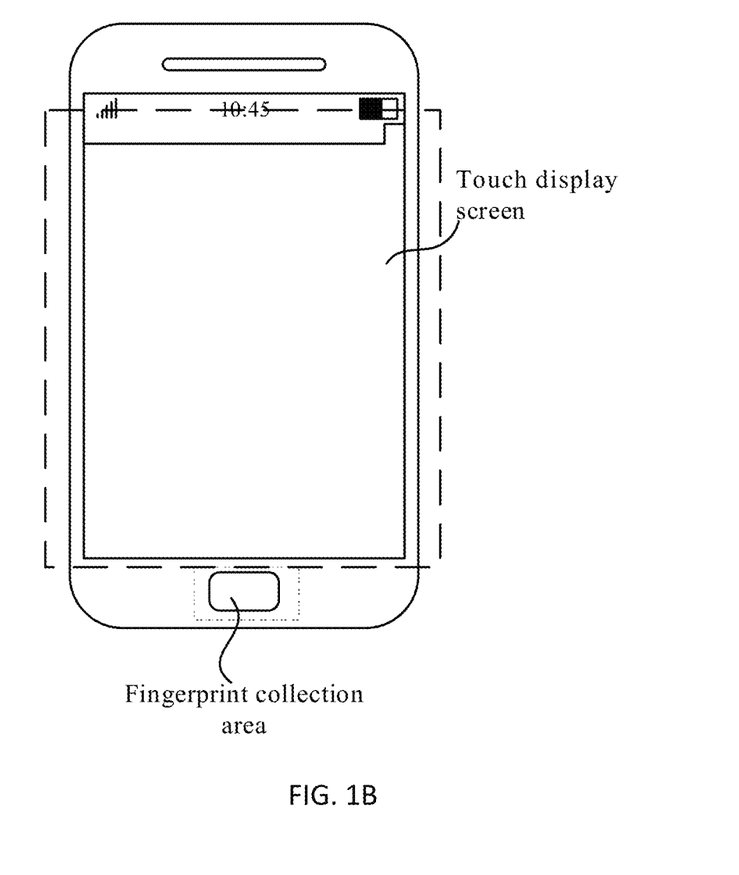
FIG. 1B is a schematic diagram of an electronic device according to an example of the present disclosure.

As shown in FIG. 1B, it is a schematic diagram of an electronic device according to an example of the present disclosure. In FIG. 1B, the fingerprint circuit is in the same area as a home key (also referred to as a primary key), and the touch display screen is set in an upper area of the home key. In an electronic device, the touch display screen and the fingerprint circuit are in a same area. For example, a fingerprint sensor may be set in the touch display screen and a fingerprint response area may be formed at a corresponding position of the touch display screen. The fingerprint response area may be touched to collect fingerprint information.

Figure 1C:
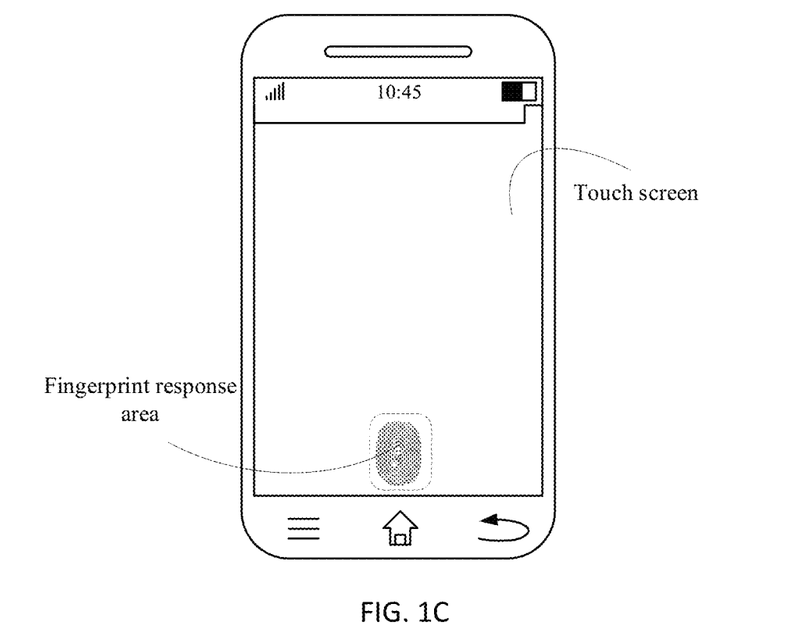
FIG. 1C is a schematic diagram of an electronic device according to another example of the present disclosure.

As shown in FIG. 1C, it is a schematic diagram of an electronic device according to another example of the present disclosure. In the schematic diagram as shown in FIG. 1C, the fingerprint sensor is disposed in the touch screen of the electronic device, and the fingerprint response area is formed at a corresponding position of the touch screen. The fingerprint sensor may include a capacitive fingerprint sensor, an optical fingerprint sensor, an ultrasonic fingerprint sensor or the like. By improving the penetrability of the fingerprint sensor or setting an area covering the fingerprint sensor on the touch screen to light transmission or semi-transmission, collecting fingerprint information by the fingerprint sensor in the touch screen may be implemented.

Regardless of the above situation, the fingerprint circuit can perform a match between the collected fingerprint information and pre-stored standard fingerprint information. If the match is successful, it can be determined that the fingerprint recognition is successful. If the match fails, it can be determined that the fingerprint recognition fails. For details on how to perform a fingerprint recognition operation based on the collected fingerprint information and the pre-stored standard fingerprint information, reference may be made to the fingerprint recognition algorithm in other implementations, which is not limited herein. The present disclosure mainly describes corresponding processing according to recognition results.

When the fingerprint recognition operation is really needed, the user often touches the fingerprint collection area and rarely touches other touch areas. Correspondingly, when the fingerprint collection area is mis-touched, the fingerprint collection area and other touch area both are touched. In view of this, it is determined whether the current touch operation is a mis-touching operation by determining whether other touch area besides the fingerprint collection area is also touched. Therefore, when the fingerprint recognition fails, the touch information on the designated area within the touch screen may be obtained. Where, the designated area may include a touch area that satisfies a preset requirement, and the preset requirement may be that the distance between the touch area and the fingerprint collection area is within the designated range. For example, the designated range may cover an area that includes both the fingerprint collection area and an additional area that the user may touch on the touch screen that is nearby the fingerprint collection area. The additional area may be an area that is around the fingerprint collection area or may be on the side of the fingerprint collection area. The designated range may also be flexibly configured and determined.

The fingerprint collection area can be determined based on the fingerprint sensor. The fingerprint circuit can collect fingerprint information in the fingerprint collection area.

In an example, since the fingerprint sensor may be in the same area as the home key, the touch area satisfying the preset requirement may include a back key touch area and/or a menu key touch area. For example, when the menu key and the return key are independent touch chips with respect to the touch display screen, if the designated area includes a menu key touch area and/or a return key touch area, the power consumption can be made lower. The designated area may also include the entire touch area. The designated area may also include a touch display area (this area has both a touch function and a display function) within the designated range from the fingerprint collection area.

Figure 1D:
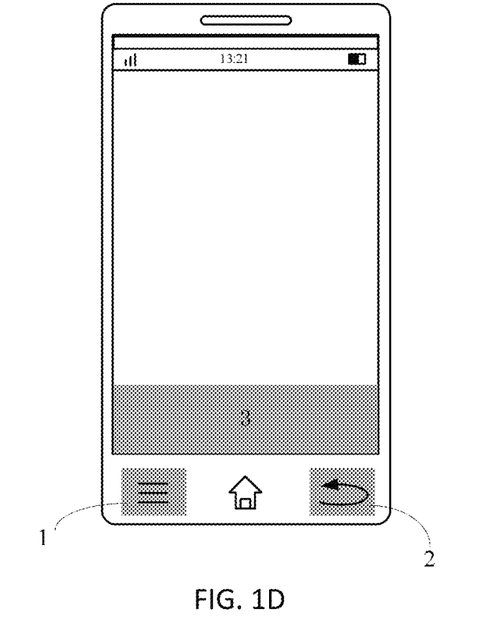
FIG. 1D is a schematic diagram of a designated area according to an example of the present disclosure.

The shape of the designated area may include a rectangle, an ellipse, an arc, or the like. As shown in FIG. 1D, it is a schematic diagram of a designated area according to an example of the present disclosure. In the schematic diagram as shown in FIG. 1D, area 1 represents the menu key touch area, area 2 represents the return key touch area, and area 3 represents a bottom area of the touch display screen, which is a rectangular area. In an example, the designated area may include area 1, area 2 and/or area 3. It can be understood that the designated area can also include other shapes, which is not limited herein.

In another example, the fingerprint sensor and the home key are not in the same area. For example, the fingerprint sensor is set in the touch screen and a fingerprint response area is formed in the corresponding position of the touch screen. In this case, the designated area may include a touch area adjacent to the fingerprint response area, such as, a circular area which takes the fingerprint response area as a center and a designated length as a radius. If the fingerprint response area is closer to the home key/back key/menu key, the designated area may also include the home key/back key/menu key touch area, and so on.

Regarding obtaining the touch information, the touch information may be obtained from the touch circuit in the touch screen. The touch information may be generated due to the touch screen being touched. When the touch circuit is under a scanning mode, the touch information may be obtained by scanning. The scanning mode is an operating mode of the touch circuit. Under the scanning mode, the touch circuit can scan in real time or scan at a designated frequency, so as to collect the touch information.

In an example, the touch circuit may be under the scanning mode for a long time.

In an example, the touch circuit may be configured to collect touch information of any area within the touch screen. In this case, an area that the touch circuit may scan is the entire touch screen area. All collection circuits on the touch circuit are under the scanning mode. In another example, the touch circuit is configured to only collect touch information on a designated area within the touch screen. By defining the scanning area of the touch circuit as the designated area within the touch screen, only collection circuits in the designated area are set to the scanning mode. In this way, it is avoided that all the collection circuits are under the scanning mode and the power consumption can be reduced.

In some examples, if the touch circuit is under the scanning mode for a long time, the scanning may consume power, which can cause relatively high power consumption. To reduce power consumption, the touch circuit may switch modes. By switching modes, the touch circuit enters the scanning mode when the fingerprint recognition fails, and the default state of the touch circuit is in the sleep mode, thereby reducing power consumption. Where, the sleep mode is an operating mode of the touch circuit. Under the sleep mode, the touch circuit does not need to scan, and the power consumption is relatively lower.

In an example, the method of processing fingerprint recognition further includes:

When the fingerprint recognition fails, a first mode switching instruction is sent to the touch circuit. The first mode switching instruction is to instruct the touch circuit to switch from the sleep mode into the scanning mode.

Correspondingly, when the fingerprint recognition failure operation is prohibited from being executed, a second mode switching instruction is sent to the touch circuit. The second mode switching instruction is to instruct the touch circuit to switch from the scanning mode into the sleep mode.

In an example, fingerprint recognition failure may be used as a condition for the touch circuit to switch from the sleep mode into the scanning mode, and prohibiting a fingerprint recognition failure operation from being executed may be used as a condition for the touch circuit to switch from the scanning mode into the sleep mode, thereby limiting the start of the scanning mode of the touch circuit. Fingerprint recognition failure can be used as one of starting conditions to avoid wasting power consumption caused by the long-term scanning mode of the touch circuit, thereby reducing power consumption. Correspondingly, the starting condition of the scanning mode of the touch circuit may also be other, which is not limited in the present disclosure.

In an example, when the fingerprint recognition fails, the touch circuit is used to collect touch information of any area within the touch screen. In this case, the area that the touch circuit can scan includes the entire touch screen area, and all collection circuits on the touch circuit are under the scanning mode.

In another example, when the fingerprint recognition fails, the touch circuit is used to collect touch information on a designated area within the touch screen. In this case, the area that the touch circuit can scan includes the designated area within the touch screen. When the fingerprint recognition fails, only collection circuits in the designated area are set to the scanning mode, which can avoid that all the collection circuits are under the scanning mode and the power consumption can be reduced.

In above examples, it is not required that the touch circuit is always under the scanning mode, and only when the fingerprint recognition by the fingerprint circuit fails, the touch circuit starts the scanning mode. The default state of the touch circuit is under the sleep mode, thereby reducing power consumption.

After obtaining the touch information, it may be determined whether the designated area satisfies a preset touch condition based on the touch information, so as to determine whether the current touch operation is a mis-touch operation. Where, the touch condition may be a condition that the designated area needs to satisfy when a mis-touch operation is performed.

Before describing the touch condition in detail, the basic principle of the touch circuit is first introduced. In an example, the basic principle of the touch circuit may be detecting a change in the capacitance signal. In the following, the projected capacitive touch technology is taken as an example for illustration.

Figure 1E:
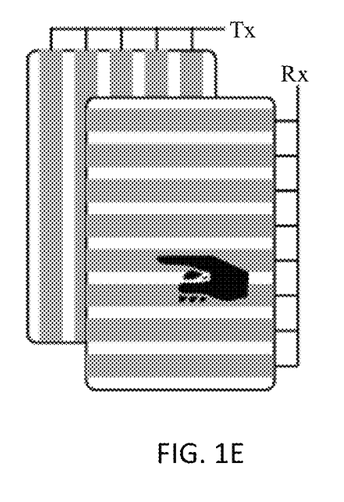
FIG. 1E is a schematic diagram of a transmitter at a lower conductive glass and a receiver at an upper conductive glass according to an example of the present disclosure.
Figure 1F:
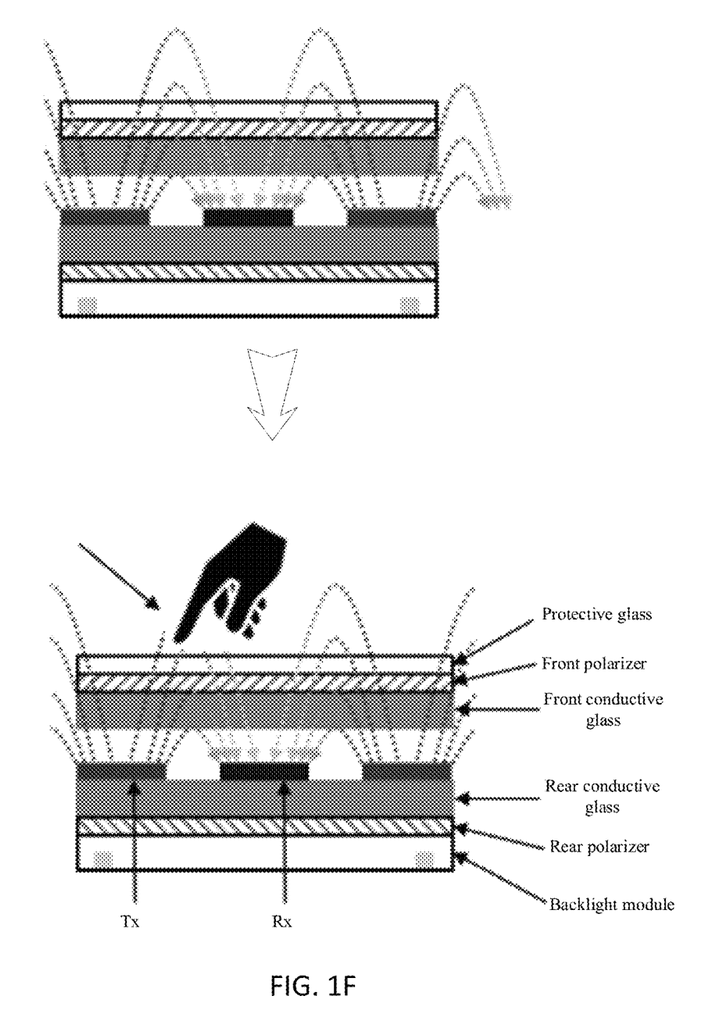
FIG. 1F is a schematic diagram of the transmitter and the receiver both at a rear conductive glass according to an example of the present disclosure.

The sensor pattern of the projected capacitive touch may include a transmitter (abbreviated as Tx) having vertical lines and a receiver (abbreviated as Rx) having horizontal lines. The horizontal lines and the vertical lines may be evenly distributed on the entire panel. As shown in FIG. 1E, it is a schematic diagram of a transmitter at a lower conductive glass and a receiver at an upper conductive glass according to an example of the present disclosure. It is understood that Tx projects the power line, and the power line through insulator (such as, liquid crystal or air) reaches Rx to form a capacitor. Since the human body itself is a conductor, when the finger of the user touches the touch screen, the power line can be influenced in a way that the capacitance of the capacitor is changed, without force. The contacted position of the finger can be determined based on the change of the capacitance measured by Rx. As shown in FIG. 1F, it is a schematic diagram of the transmitter and the receiver both at a rear conductive glass according to an example of the present disclosure. It is understood that Tx may be above the rear conductive glass, Rx may be above the front conductive glass, under the front conductive glass, or above the rear conductive glass, etc. FIG. 1F illustrates an example where Rx is above the rear conductive glass.

Figure 1G:
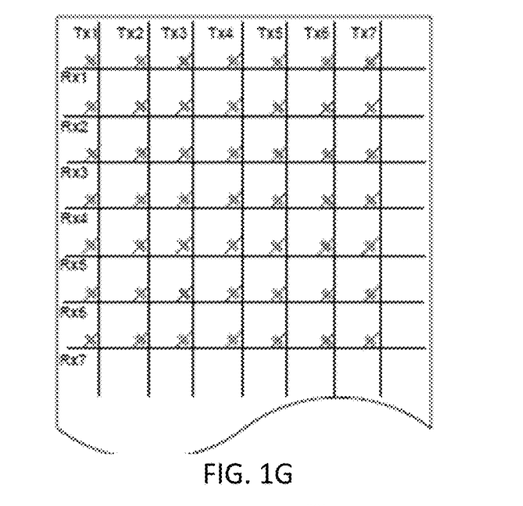
FIG. 1G is a schematic diagram of a matrix composed of Tx and Rx according to an example of the present disclosure.

Tx channels and Rx channels in the touch circuit are respectively used to send electrical signals and receive electrical signals. Tx and Rx may be made of ITO (Indium Tin Oxide) material and have conductivity. Therefore, a capacitance signal is formed at the intersection of Tx channels and Rx channels. When the finger touches the touch screen, it can cause a change of the capacitance signal. The touch circuit can detect the change of the capacitance signal. The amount of change of the capacitance signal can be called as capacitance variation. As shown in FIG. 1G, it is a schematic diagram of a matrix composed of Tx and Rx according to an example of the present disclosure. The touch screen of the electronic device may include a certain number of rectangles formed by Tx channels and Rx channels. Each of the rectangles has a certain capacitance variation. When no finger touches the touch screen, the capacitance is basically unchanged and the capacitance variation also approaches zero. When there is a finger touching or approaching the screen, the capacitance variation may be changed in a way that a matrix diagram composed of a capacitance variation of the intersection of respective Tx channels and respective Rx channels is obtained.

In view of this, in an example, the touch information may include a touch value which represents the size of the touch signal. For example, the touch value may include a capacitance variation.

In an example, if the fingerprint recognition fails, the touch circuit collects touch information of any area within the touch screen, and then the position information of the touch point may be obtained according to the capacitance variation. The electronic device may obtain the touch information on the designated area from the touch circuit according to the position information.

In another example, if the fingerprint recognition fails, the touch circuit collects the touch information on a designated area within the touch screen, and then the touch circuit may not determine the position information of the touch point and only determine the capacitance variation. The electronic device obtains the capacitance variation by the touch circuit and determines whether the designated area satisfies the preset touch condition according to the capacitance variation. In the scanning mode, the touch circuit only needs to determine the capacitance variation and does not perform any additional work, which can further reduce the power consumption.

In view of this, determining that the designated area satisfies the preset touch condition based on the touch information includes: determining that the designated area satisfies the preset touch condition when the touch value is greater than or equal to a first preset threshold. The touch value can be the capacitance variation. For example, when the capacitance variation is greater than or equal to the first preset threshold, it is determined that the designated area satisfies the preset touch condition, and further the current touch operation is a mis-touch operation. The fingerprint recognition failure operation may be prohibited from being executed. In an example, if there is only one sensor area in the designated area, the mis-touch determination may be directly performed according to the size of the touch value. For example, when the designated area is the return key touch area or the menu key touch area, since the return key touch area or the menu key touch area often has only one sensor area, it can be determined whether the touch value satisfies the condition. The first preset threshold may be flexibly configured to determine whether a touch operation on the fingerprint collection area is a mis-touch operation based on a touch operation on the designated area.

In another example, the touch information may include a touch value and a number of touch values. Determining that the designated area satisfies the preset touch condition based on the touch information includes: determining that the designated area satisfies the preset touch condition when the number of touch values greater than or equal to a second preset threshold is greater than or equal to a preset number threshold.

Therefore, when the touch values are greater than or equal to the second preset threshold and the number of the touch values is greater than or equal to the preset number threshold, the fingerprint recognition failure operation may be prohibited from being executed. In an example, when the designated area is a designated display area within the touch screen and the distance between the designated display area and the fingerprint collection area is within a designated range, since the touch screen often has multiple sensor areas, the number of touch values can be used to determine whether the current touch operation is a mis-touch operation.

It is understood that the touch condition may also include other conditions, which are not limited herein.

Regarding the fingerprint recognition failure operation, in an example, the fingerprint recognition failure operation may include increasing a number of incorrect recognition times by one, performing a vibrating prompt, lighting up the touch screen and the like. Lighting up the touch screen indicates that the touch screen of the electronic device is changed from dark to light. When the touch screen of the electronic device is dark, it indicates that the electronic device is locked. When the touch screen of the electronic device is light, it indicates that the electronic device is unlocked. The fingerprint recognition failure operation may also include other operations, which are not limited herein.

Further, when the fingerprint recognition is successful, the processing, such as, unlocking the electronic device or unlocking the electronic device by lighting up the touch screen, a payment operation, a login operation and so on, corresponding to successful authentication can be performed.

Further, if it is determined that the designated area does not satisfy the preset touch condition based on the touch information, the fingerprint recognition failure operation is performed. The fingerprint recognition failure operation includes increasing a number of incorrect recognition times by one, performing a vibrating prompt, lighting up the touch screen and the like.

Correspondingly, if it is determined that the designated area does not satisfy the preset touch condition based on the touch information, the second mode switching instruction may also be sent to the touch circuit. Where the second mode switching instruction is to instruct the touch circuit to switch from the scanning mode into the sleep mode, so that the touch circuit enters the sleep mode and power consumption is reduced.

The various technical features in the above examples may be arbitrarily combined as long as there is no conflict or inconsistency between the combinations of the features. But due to space limitations, some description is omitted. Therefore, any combination of various technical features in the above examples also belongs to the scope of this specification.

The following is an example of one of these combinations.

Figure 2:
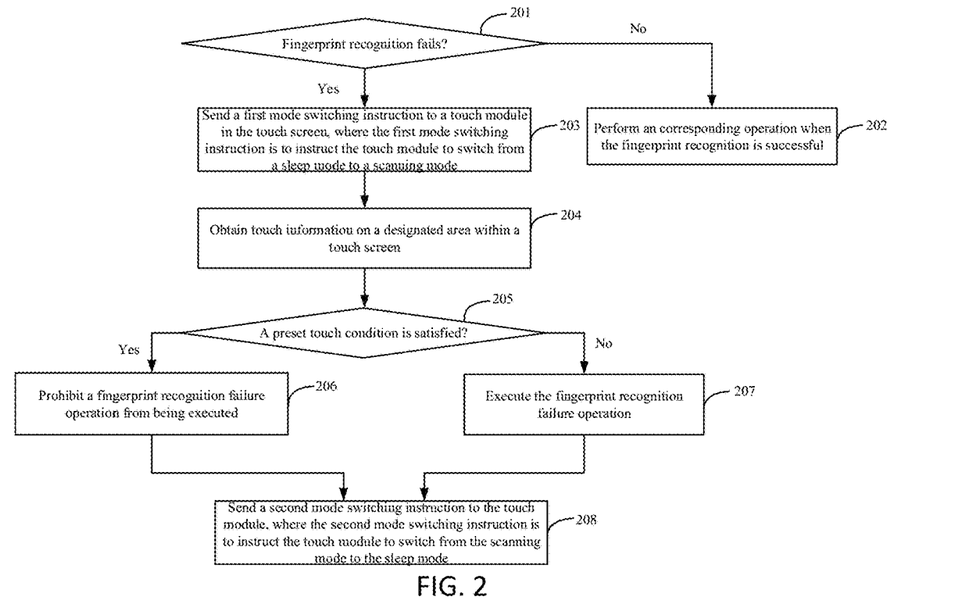
FIG. 2 is a flowchart of a method of processing fingerprint recognition according to another example of the present disclosure.

As shown in FIG. 2, it is a flowchart of a method of processing fingerprint recognition according to another example of the present disclosure. The method may be applied in an electronic device. The process of the method may include the following steps:

At step 201, it is determined whether the fingerprint recognition fails. If no, the process proceeds to step 202, and if yes, the process proceeds to step 203.

At step 202, when the fingerprint recognition is successful, a corresponding operation, such as, lighting up the touch screen and unlocking, is performed.

At step 203, a first mode switching instruction is sent to a touch circuit. The first mode switching instruction is to instruct the touch circuit to switch from a sleep mode into a scanning mode. The touch circuit is configured to obtain the touch information on the designated area within the touch screen when the fingerprint recognition fails. The designated area is a touch area within a designated range from the fingerprint collection area.

At step 204, touch information on a designated area within the touch screen is obtained.

At step 205, it is determined whether the designated area satisfies a preset touch condition based on the touch information, so as to determine whether the current touch operation is a mis-touch operation. Where, the preset touch condition may be a condition that the designated area needs to satisfy when the mis-touch operation is performed. If the preset touch condition is satisfied, the process proceeds to step 206, and if the preset touch condition is not satisfied, the process proceeds to step 207.

At step 206, a fingerprint recognition failure operation is prohibited from being executed, and the process proceeds to step 208.

In step 207, a fingerprint recognition failure operation is executed, and the process proceeds to step 208.

In step 208, a second mode switching instruction is sent to the touch circuit. The second mode switching instruction is to instruct the touch circuit to switch from the scanning mode into the sleep mode.

As can be seen from the above examples, in the method of processing fingerprint recognition, it is not required that the touch circuit is always under the scanning mode, and when the fingerprint recognition by the fingerprint circuit fails, the touch circuit starts the scanning mode. The default state of the touch circuit is in the sleep mode and power consumption is relatively low. Further, when the fingerprint recognition fails, the touch circuit only scans the designated area, only touch information is obtained and positions of touch points are not needed. In this way, power consumption is further reduced. At the same time, interference for the user caused by mis-touching the touch screen is avoided.

Corresponding to the above examples of the method of processing fingerprint recognition, the present disclosure further provides examples of an apparatus of processing fingerprint recognition, an electronic device applied by the apparatus, and a storage medium.

Figure 3:
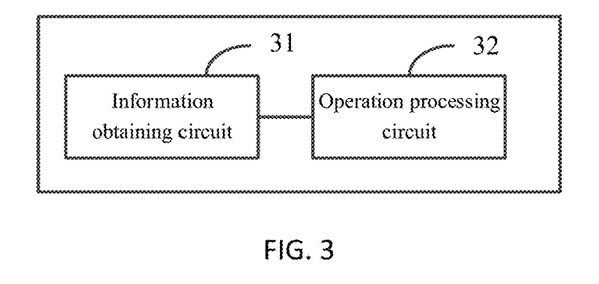
FIG. 3 is a block diagram of a fingerprint recognition processing apparatus according to an example of the present disclosure.

As shown in FIG. 3, it is a block diagram of a fingerprint recognition processing apparatus according to an example of the present disclosure. The apparatus includes an information obtaining circuit 31 and an operation processing circuit 32.

The information obtaining circuit 31 is configured to obtain touch information on a designated area within a touch screen when the fingerprint recognition fails. Where the designated area includes a touch area and a distance between the touch area and a fingerprint collection area is within a designated range.

The operation processing circuit 32 is configured to prohibit a fingerprint recognition failure operation from being executed when it is determined that the designated area satisfies a preset touch condition based on the touch information.

Figure 4:
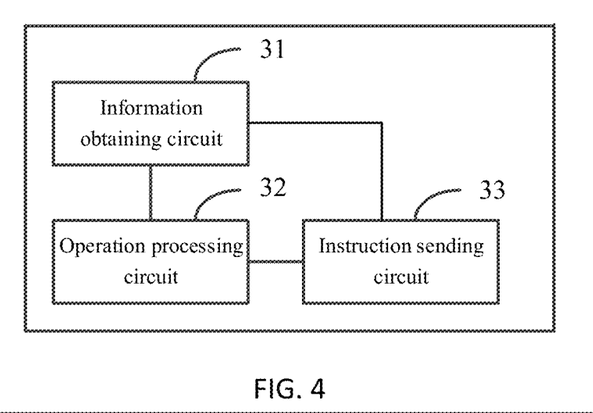
FIG. 4 is a block diagram of a fingerprint recognition processing apparatus according to another example of the present disclosure.

As shown in FIG. 4, it is a block diagram of a fingerprint recognition processing apparatus according to another example of the present disclosure. This example is based on the above example shown in FIG. 3. The apparatus shown in FIG. 4 further includes an instruction sending circuit 33.

The instruction sending circuit 33 is configured to send a first mode switching instruction to a touch circuit in the touch screen when the fingerprint recognition fails, where the first mode switching instruction is to instruct the touch circuit to switch from a sleep mode into a scanning mode; and send a second mode switching instruction to the touch circuit when the fingerprint recognition failure operation is prohibited from being executed, where the second mode switching instruction is to instruct the touch circuit to switch from the scanning mode into the sleep mode.

When the fingerprint recognition fails, the touch circuit is configured to obtain the touch information on the touch screen via the scanning mode, or obtain the touch information on the designated area within the touch screen via the scanning mode.

In an example, the designated area includes at least one of following areas: a return key touch area, a menu key touch area and a touch display area having a distance from the fingerprint collection area within the designated range.

Figure 5:
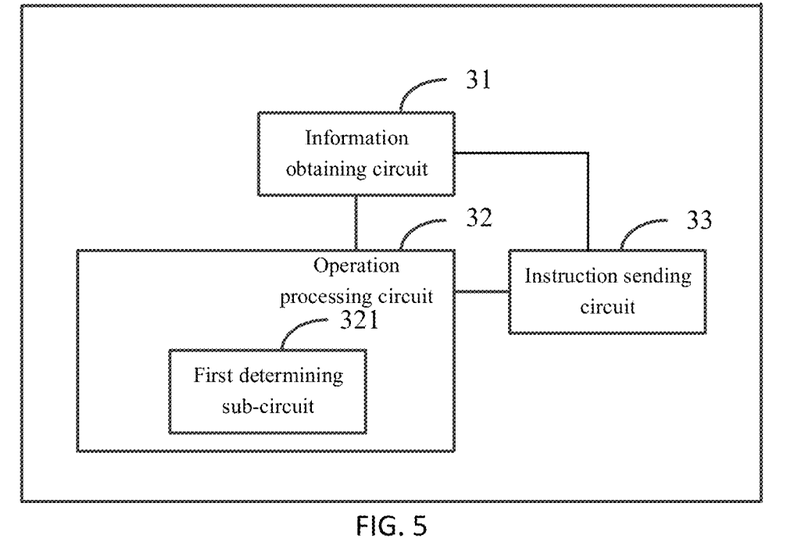
FIG. 5 is a block diagram of a fingerprint recognition processing apparatus according to another example of the present disclosure.

As shown in FIG. 5, it is a block diagram of a fingerprint recognition processing apparatus according to another example of the present disclosure. This example is based on the above example shown in FIG. 3 or the above example shown in FIG. 4. The touch information includes a touch value. The operation processing circuit 32 includes a first determining sub-circuit 321. FIG. 5 is illustrated based on FIG. 4.

The first determining sub-circuit 321 is configured to determine that the designated area satisfies the preset touch condition when the touch value is greater than or equal to a first preset threshold.

Figure 6:
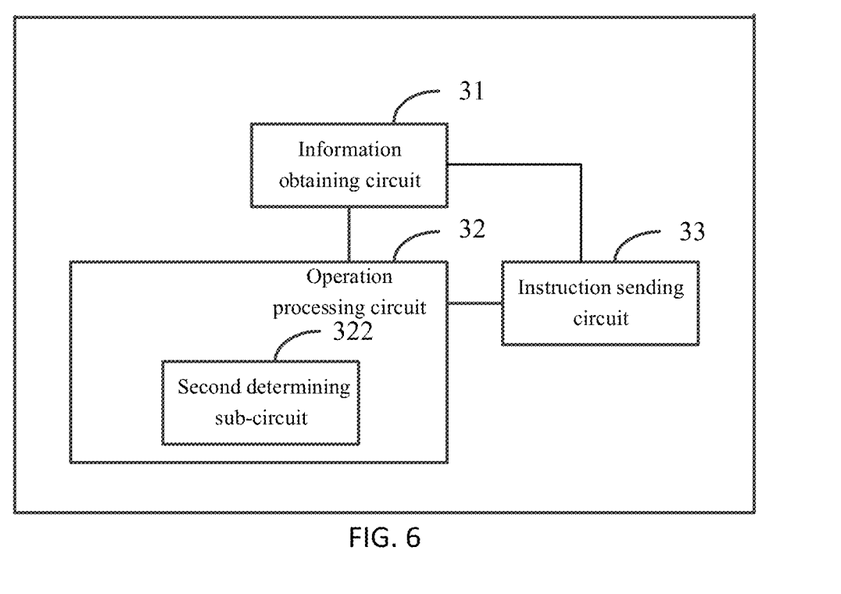
FIG. 6 is a block diagram of a fingerprint recognition processing apparatus according to still another example of the present disclosure.

As shown in FIG. 6, it is a block diagram of a fingerprint recognition processing apparatus according to still another example of the present disclosure. This example is based on the above example shown in FIG. 3 or the above example shown in FIG. 4. The touch information includes a touch value and a number of touch values. The operation processing circuit 32 includes a second determining sub-circuit 322. FIG. 6 is illustrated based on FIG. 4.

The second determining sub-circuit 322 is configured to determine that the designated area satisfies the preset touch condition when the number of touch values greater than or equal to a second preset threshold is greater than or equal to a preset number threshold.

In an example, the fingerprint recognition failure operation comprises at least one of following: increasing a number of incorrect recognition times by one; performing a vibrating prompt; and lighting up the touch screen.

Correspondingly, the present disclosure further provides an electronic device. The electronic device includes a processor and a non-transitory machine-readable storage medium to store machine executable instructions. Where the processor is configured to perform the above method of processing fingerprint recognition.

Correspondingly, the present disclosure further provides a machine-readable storage medium. Machine executable instructions are stored on the storage medium. The machine executable instructions cause a processor to perform the above method of processing fingerprint recognition.

The machine-readable storage medium in the present disclosure may include but not limited to a magnetic disk memory, a CD-ROM, an optical memory, etc. The machine-readable storage medium may include permanent and non-permanent, removable and non-removable media, and can realize information storage by any method or technique. The information may be computer-readable instructions, a data structure, a module of a program or other data. Examples of the machine-readable medium may include but are not limited to: Phase Change Random Access Memory (PRAM), Static Random Access Memory (SRAM), Dynamic Random Access Memory (DRAM), other types of Random Access Memories (RAMs), Read-Only Memory (ROM), Electrically Erasable Programmable Read-Only Memory (EEPROM), Flash Memory or other memory techniques, Compact Disk Read-Only Memory (CD-ROM), Digital Versatile Disk (DVD) or other optical storages, magnetic cassette tape, magnetic tape magnetic/disk storage or other magnetic storage devices or any other non-transmission media that can be used to store information accessible to a computing device.

Details of the implementation process of the functions and effects of different modules in the above-described apparatus may be seen from the implementation process of corresponding steps in the above-described method, which will not be redundantly described here.

Since the apparatus examples substantially correspond to the method examples, a reference may be made to part of the descriptions of the method examples for the related part. The apparatus examples described above are merely illustrative, where the modules described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out those without creative work.

Figure 7:
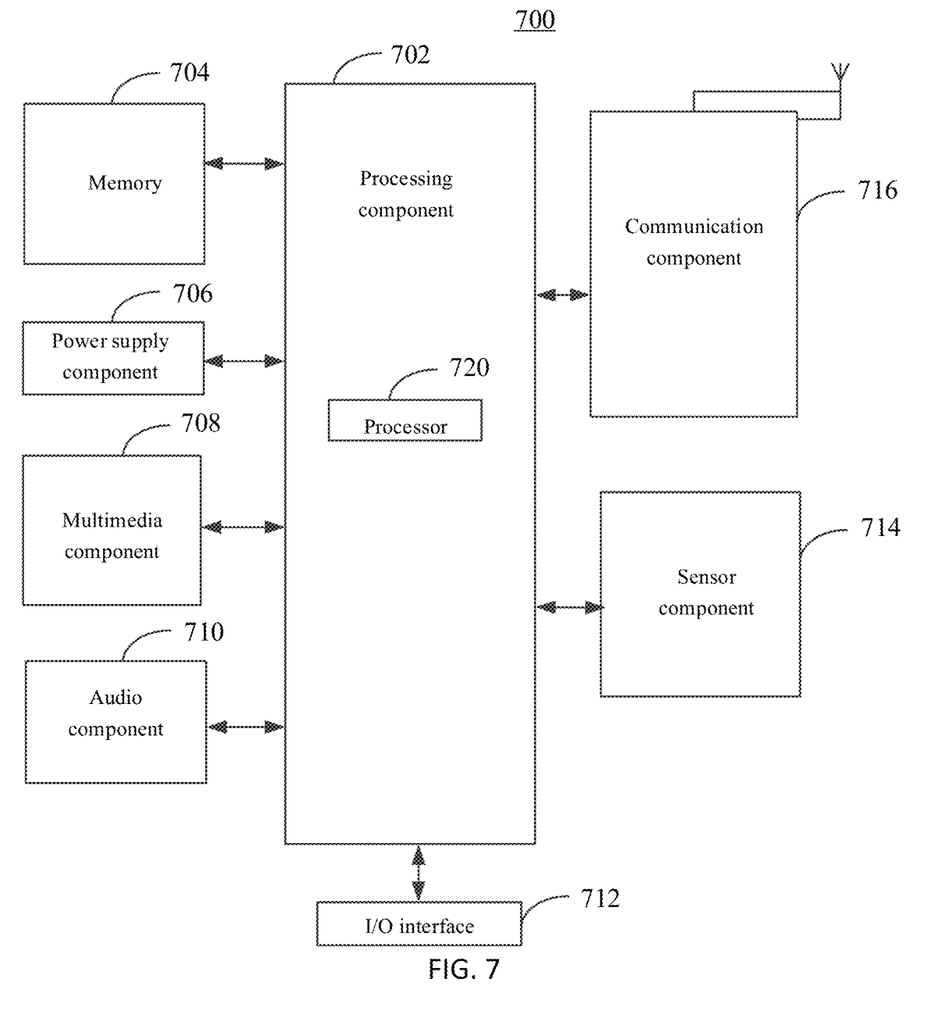
FIG. 7 is a diagram illustrating a hardware structure of an electronic device according to an example of the present disclosure.

As shown in FIG. 7, it is a diagram illustrating a hardware structure of an electronic device according to an example of the present disclosure. The electronic device 700 may be a terminal having the touch function and the fingerprint recognition function, such as a mobile phone, a computer, a digital broadcasting terminal, a message transceiver, a game console, a tablet device, a medical device, a fitness facility, and a personal digital assistant.

With reference to FIG. 7, the electronic device 700 may include one or more of: a processing component 702, a memory 704, a power supply component 706, a multimedia component 708, an audio component 710, an Input/Output (I/O) interface 712, a sensor component 714, and a communication component 716.

The processing component 702 generally controls the overall operations of the electronic device 700, such as operations associated with display, calling, data communication, camera operation and recording operation. The processing component 702 may include one or more processors 720 for executing instructions to complete all or part of steps of the above-described method. Besides, the processing component 702 may include one or more modules to facilitate interactions between the processing component 702 and other components. For example, the processing component 702 may include a multimedia module to facilitate the interaction between the multimedia component 708 and the processing component 702.

The memory 704 is configured to store different types of data to support the operations of the electronic device 700. Examples of such data include instructions of any application program or method operable on the electronic device 700, contact data, telephone directory data, messages, pictures, videos, and the like. The memory 704 may be implemented by any type of volatile or non-volatile storage device or a combination thereof, such as a Static Random Access Memory (SRAM), an Electrically Erasable Programmable Read-Only Memory (EEPROM), an Electrically Programmable Read-Only-Memory (EPROM), a Programmable Read-Only-Memory (PROM), a Read-Only Memory (ROM), a magnetic memory, a flash memory, a magnetic disk or an optical disk.

The power supply component 706 provides power for different components of the electronic device 700. The power supply component 706 may include a power management system, one or more power sources, and other components associated with generating, managing and distributing power for the electronic device 700.

The multimedia component 708 may include a screen for providing an output interface between the device 700 and a user. In some examples, the screen may include a Liquid Crystal Display (LCD) and/or a Touch Panel (TP). If the screen includes a touch panel, the screen may be implemented as a touch screen to receive input information from a user. The touch panel may include one or more touch sensors to sense touch, slide and gestures on the touch panel. The touch sensor may not only sense the boundary of a touch or slide motion but also detect duration and pressure related to the touch or slide operation. In some examples, the multimedia component 708 includes a front-facing camera and/or a rear camera. When the electronic device 700 is in an operating mode, such as a shooting mode or a video mode, the front-facing camera and/or the rear camera may receive external multimedia data. Each of the front-facing camera and the rear camera may be a fixed optical lens system or be capable of focal length and optical zoom.

The audio component 710 is configured to output and/or input an audio signal. For example, the audio component 710 may include a microphone (MIC). When the electronic device 700 is in an operating mode, such as a call mode, a recording mode and a speech recognition mode, the microphone is configured to receive an external audio signal. The received audio signal may be further stored in the memory 704 or transmitted via the communication component 716. In some examples, the audio component 710 may also include a speaker for outputting an audio signal.

The I/O interface 712 provides an interface between the processing component 702 and a peripheral interface module. The peripheral interface module may be a keyboard, a click wheel, a button and the like. Such buttons may include but not limited to: a home button, a volume button, a start button and a lock button.

The sensor component 714 may include one or more sensors for providing state assessments in different aspects for the device 700. For example, the sensor component 714 may detect the on/off state of the electronic device 700, and relative locations of components, such as a display and a small keyboard of the electronic device 700. The sensor component 714 may also detect a position change of the electronic device 700 or a component of the device electronic 700, the presence or absence of contact of a user with the electronic device 700, an orientation or acceleration/deceleration of the electronic device 700 and a temperature change of the electronic device 700. The sensor component 714 may include a proximity sensor configured to detect a nearby object without any physical contact. The sensor component 714 may also include an optical sensor, such as a CMOS or CCD image sensor for being used in imaging application. In some examples, the sensor component 714 may also include an acceleration sensor, a gyroscope sensor, a magnetic sensor, a pressure sensor, or a temperature sensor.

The communication component 716 is configured to facilitate wired or wireless communication between the electronic device 700 and other devices. The electronic device 700 may access a wireless network based on a communication standard, such as WIFI, 2G or 3G, or a combination thereof. In an example, the communication component 716 receives a broadcast signal or broadcast related information from an external broadcast management system via a broadcast channel. In an example, the communication component 716 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

In an example, the electronic device 700 may be implemented by one or more of an Application Specific Integrated Circuit (ASIC), a Digital Signal Processor (DSP), a Digital Signal Processor (DSPD), a Programmable Logic Device (PLD), a Field Programmable Gate Array (FPGA), a controller, a microcontroller, a microprocessor or other electronic components, so as to perform the above method.

In an example, the present disclosure further provides a non-transitory machine-readable storage medium storing machine executable instructions, such as memory 704 to store instructions. The instructions may be executed by processor 720 in the electronic device 700 to complete the above method. In an example, the non-transitory machine-readable storage medium includes ROM, RAM, CD-ROM, magnetic tape, soft disk and optical data storage.

When the instructions stored on the non-transitory machine-readable storage medium are executed by the processor, the electronic device 700 can perform the above method of processing fingerprint recognition.

In examples of the present disclosure, when fingerprint information is collected, the fingerprint recognition operation is performed. If the fingerprint recognition fails, the touch information on the designated area within the touch screen is obtained. Then it is determined whether the designated area satisfies a preset touch condition based on the touch information, so as to determine whether the current touch operation is a mis-touch operation. When it is determined that the current touch operation is a mis-touch operation, a fingerprint recognition failure operation is prohibited from being executed, thereby avoiding some problems caused by executing the fingerprint recognition failure operation due to mis-touching. These problems may include power waste, vibrating prompt and/or the accumulated number of incorrect recognition times reaching the preset threshold. When the accumulated number of incorrect recognition times reaches the preset threshold, unlocking by the fingerprint may not performed normally.

In view of this, the present disclosure provides a method of recognizing a fingerprint, an electronic device, and a non-transitory machine-readable storage medium.

According to an aspect of the present disclosure, a method of recognizing a fingerprint is provided. The method includes: obtaining touch information on a designated area within a touch screen when a fingerprint recognition fails, wherein a distance between the designated area and a fingerprint collection area of the fingerprint recognition is within a designated range; and prohibiting a fingerprint recognition failure operation from being executed when the touch information indicates that the designated area satisfies a preset touch condition.

According to another aspect of the present disclosure, an electronic device is provided, which includes: a processor and a non-transitory machine-readable storage medium to store machine executable instructions. The processor is configured to: obtain touch information on a designated area within a touch screen when a fingerprint recognition fails, wherein a distance between the designated area and a fingerprint collection area of the fingerprint recognition is within a designated range; and prohibit a fingerprint recognition failure operation from being executed when the touch information indicates that the designated area satisfies a preset touch condition.

According to an additional aspect of the present disclosure, a non-transitory machine-readable storage medium is provided. Machine executable instructions are stored on the non-transitory machine-readable storage medium. The machine executable instructions cause a processor to perform: obtaining touch information on a designated area within a touch screen when a fingerprint recognition fails, wherein a distance between the designated area and a fingerprint collection area of the fingerprint recognition is within a designated range; and prohibiting a fingerprint recognition failure operation from being executed when the touch information indicates that the designated area satisfies a preset touch condition.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

After considering the description and practicing the present disclosure, those skilled in the prior art may easily conceive of other implementations of the present disclosure. The present disclosure is intended to encompass any variations, uses and adaptive changes of the present disclosure. These variations, uses and adaptive changes follow the general principle of the present disclosure and include common knowledge or conventional technical means in the prior art not disclosed in the present disclosure. The description and examples herein are intended to be illustrative only.

It shall be appreciated that the present disclosure is not limited to the precise structures described above and shown in the accompanying drawings and may be modified or changed without departing from the scope of the present disclosure.

The foregoing descriptions are merely part of examples of the present disclosure and not intended to limit the present disclosure. Any modifications, equivalent substitutions, adaptations made within the scope of the present disclosure shall be encompassed in the scope of protection the present disclosure.

What is claimed is:

1. A method of recognizing a fingerprint, comprising:
    obtaining touch information on a designated area within a touch screen of an electronic device when a fingerprint recognition fails, wherein a distance between the designated area and a fingerprint collection area for recognizing the fingerprint is within a designated range; and
    prohibiting a fingerprint recognition failure operation from being executed when the touch information indicates that the designated area satisfies a preset touch condition.

2. The method of claim 1, wherein obtaining the touch information on the designated area within the touch screen of the electronic device comprises:
    sending a first mode switching instruction to a touch circuit in the touch screen;
    wherein the first mode switching instruction is to instruct the touch circuit to switch from a sleep mode into a scanning mode and obtain the touch information on the touch screen.

3. The method of claim 2, wherein the touch circuit is configured to obtain the touch information on the designated area within the touch screen via the scanning mode.

4. The method of claim 2, wherein prohibiting the fingerprint recognition failure operation from being executed comprises:
    sending a second mode switching instruction to the touch circuit;
    wherein the second mode switching instruction is to instruct the touch circuit to switch from the scanning mode to the sleep mode.

5. The method of claim 1, wherein the designated area includes at least one of following areas:
    a return key touch area;
    a menu key touch area; and
    a touch display area having a distance from the fingerprint collection area within the designated range.

6. The method of claim 1, wherein the touch information comprises a touch value and a number of the touch value.

7. The method of claim 6, wherein the touch information indicating that the designated area satisfies the preset touch condition comprises:
    the touch value is greater than or equal to a first preset threshold.

8. The method of claim 6, wherein the touch information indicating that the designated area satisfies the preset touch condition comprises:
    the number of the touch value is greater than or equal to a preset number threshold, wherein the touch value is greater than or equal to a second preset threshold.

9. The method of claim 1, wherein the fingerprint recognition failure operation comprises at least one of following:
    increasing a number of incorrect recognition times by one;
    performing a vibrating prompt; and
    lighting up the touch screen.

10. An electronic device, comprising:
    a processor; and
    a non-transitory machine-readable storage medium to store instructions that are executable by the processor;
    wherein the processor is configured to:
    obtain touch information on a designated area within a touch screen of a device when a fingerprint recognition fails, wherein a distance between the designated area and a fingerprint collection area for recognizing a fingerprint is within a designated range; and
    prohibit a fingerprint recognition failure operation from being executed when the touch information indicates that the designated area satisfies a preset touch condition.

11. The device of claim 10, wherein, when the touch information on the designated area within the touch screen of the device is obtained, the processor is configured to:
    send a first mode switching instruction to a touch circuit in the touch screen;
    wherein the first mode switching instruction is to instruct the touch circuit to switch from a sleep mode into a scanning mode and obtain the touch information on the touch screen.

12. The device of claim 11, wherein the touch circuit is configured to obtain the touch information on the designated area within the touch screen via the scanning mode.

13. The device of claim 11, wherein, when the fingerprint recognition failure operation from being executed is prohibited, the processor is configured to:
    send a second mode switching instruction to the touch circuit;
    wherein the second mode switching instruction is to instruct the touch circuit to switch from the scanning mode to the sleep mode.

14. The device of claim 10, wherein the designated area includes at least one of following areas:
    a return key touch area;

a menu key touch area; and a touch display area having a distance from the fingerprint collection area within the designated range.

15. The device of claim 10, wherein the touch information comprises a touch value and a number of the touch value.

16. The device of claim 15, wherein the touch information indicating that the designated area satisfies the preset touch condition comprises:

the touch value is greater than or equal to a first preset threshold.

17. The device of claim 15, wherein the touch information indicating that the designated area satisfies the preset touch condition comprises:

the number of the touch value is greater than or equal to a preset number threshold, wherein the touch value is greater than or equal to a second preset threshold.

18. The device of claim 10, wherein the fingerprint recognition failure operation comprises at least one of following:

increasing a number of incorrect recognition times by one;

performing a vibrating prompt; and lighting up the touch screen.

19. A non-transitory machine-readable storage medium storing machine executable instructions, wherein the machine executable instructions causes a processor to perform:

obtaining touch information on a designated area within a touch screen of an electronic device when a fingerprint recognition fails, wherein a distance between the designated area and a fingerprint collection area for recognizing a fingerprint is within a designated range; and prohibiting a fingerprint recognition failure operation from being executed when the touch information indicates that the designated area satisfies a preset touch condition.

20. The non-transitory machine-readable storage medium of claim 19, wherein the instructions caused the processor to perform obtaining the touch information on the designated area within the touch screen of the electronic device further cause the processor to perform:

sending a first mode switching instruction to a touch circuit in the touch screen;

wherein the first mode switching instruction is to instruct the touch circuit to switch from a sleep mode into a scanning mode and obtain the touch information on the touch screen.

* * * * *